(12) United States Patent
Cantrell et al.

(10) Patent No.: US 11,362,806 B2
(45) Date of Patent: Jun. 14, 2022

(54) SYSTEM AND METHODS FOR RECORDING CODES IN A DISTRIBUTED ENVIRONMENT

(71) Applicant: Walmart Apollo, LLC, Bentonville, AR (US)

(72) Inventors: Robert Cantrell, Herndon, VA (US); Todd Davenport Mattingly, Bentonville, AR (US); John Jeremiah O'Brien, Farmington, AR (US); Brian Gerard McHale, Oldham (GB); Bruce W. Wilkinson, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 711 days.

(21) Appl. No.: 16/369,709

(22) Filed: Mar. 29, 2019

(65) Prior Publication Data
US 2019/0305934 A1    Oct. 3, 2019

Related U.S. Application Data

(60) Provisional application No. 62/650,651, filed on Mar. 30, 2018.

(51) Int. Cl.
*H04L 29/06* (2006.01)
*H04L 9/06* (2006.01)
(Continued)

(52) U.S. Cl.
CPC ............ *H04L 9/0637* (2013.01); *G06F 16/26* (2019.01); *G06Q 20/0658* (2013.01);
(Continued)

(58) Field of Classification Search
CPC ... H04L 9/0637; H04L 9/0643; H04L 9/0825; H04L 2209/42; H04L 9/3239;
(Continued)

(56) References Cited

U.S. PATENT DOCUMENTS 7,197,642 B2    3/2007   Walmsley et al.
2014/0130035 A1  5/2014  Desai et al.
(Continued)

FOREIGN PATENT DOCUMENTS

WO    WO-2017194976 A1 *  11/2017   ............ G06Q 10/087

OTHER PUBLICATIONS

International Search Report and Written Opinion for PCT/US201924821 dated Jun. 28, 2019, pp. 1-14.
(Continued)

*Primary Examiner* — John B King
(74) *Attorney, Agent, or Firm* — Fitch, Even, Tabin & Flannery LLP

(57) ABSTRACT

Systems and methods for recording codes in a distributed environment are provided. A first node receives data including at least one code from a code generation computing device via a network. The first node adds a first new block to a first cryptographically verifiable encrypted ledger, the first block containing the at least one code. The first node adds a second new block to a second cryptographically verifiable, the second block containing the at least one code. The first node or a second node retrieves the at least one code from the second cryptographically verifiable unencrypted ledger. The first node or the second node analyzes the at least one code pursuant to a set of rules.

23 Claims, 8 Drawing Sheets

(51) Int. Cl.
*G06Q 20/06* (2012.01)
*G06Q 20/36* (2012.01)
*G06F 16/26* (2019.01)
*G06Q 20/20* (2012.01)

(52) U.S. Cl.
CPC ....... *G06Q 20/202* (2013.01); *G06Q 20/3678* (2013.01); *H04L 9/0643* (2013.01)

(58) Field of Classification Search
CPC . H04L 9/3297; H04L 63/0428; H04L 63/126; H04L 2209/38; G06F 16/26; G06Q 20/0658; G06Q 20/202; G06Q 20/3678; G06Q 2220/00
See application file for complete search history.

(56) References Cited

U.S. PATENT DOCUMENTS

| | | | |
|---|---|---|---|
| 2015/0006403 A1 | 1/2015 | Shear et al. | |
| 2016/0261685 A1* | 9/2016 | Chen | H04W 12/35 |
| 2016/0275461 A1 | 9/2016 | Sprague et al. | |
| 2017/0243193 A1* | 8/2017 | Manian | G06Q 20/3829 |
| 2017/0289111 A1* | 10/2017 | Voell | H04L 9/3239 |
| 2017/0331896 A1* | 11/2017 | Holloway | H04L 67/04 |
| 2018/0018723 A1* | 1/2018 | Nagla | H04L 9/3236 |
| 2018/0041571 A1* | 2/2018 | Rogers | H04L 67/104 |
| 2018/0046766 A1* | 2/2018 | Deonarine | G06F 21/62 |
| 2018/0181768 A1* | 6/2018 | Leporini | H04L 9/0637 |
| 2018/0331832 A1* | 11/2018 | Pulsifer | G06Q 20/3825 |
| 2018/0337769 A1* | 11/2018 | Gleichauf | G06Q 20/308 |
| 2018/0351830 A1* | 12/2018 | Kenna, III | G06F 16/438 |
| 2019/0103958 A1* | 4/2019 | Wu | G06F 21/604 |
| 2019/0238338 A1* | 8/2019 | O'Brien | G08G 5/0069 |
| 2019/0272537 A1* | 9/2019 | Miller | H04L 63/0428 |
| 2019/0288846 A1* | 9/2019 | Zawierka | H04L 9/3239 |

OTHER PUBLICATIONS

International Preliminary Report on Patentability for Application No. PCT/US2019/024821, dated Oct. 15, 2020, 8 pages.

* cited by examiner

SYSTEM AND METHODS FOR RECORDING CODES IN A DISTRIBUTED ENVIRONMENT

RELATED APPLICATION

This application claims priority to U.S. Provisional Application No. 62/650,651, filed on Mar. 30, 2018, the contents of which are hereby incorporated by reference in its entirety.

BACKGROUND

Companies use data analysis to inspect, clean, transform, and model data with the goal of discovering useful information, suggesting conclusions, and supporting decision making. However, the companies must store and manage the data, while maintaining the security of the data.

BRIEF DESCRIPTION OF THE FIGURES

Illustrative embodiments are shown by way of example in the accompanying figures and should not be considered as a limitation of the present disclosure. The accompanying figures, which are incorporated in and constitute a part of this specification, illustrate one or more embodiments of the present disclosure and, together with the description, help to explain the present disclosure. In the figures.

DETAILED DESCRIPTION

Figure 1:
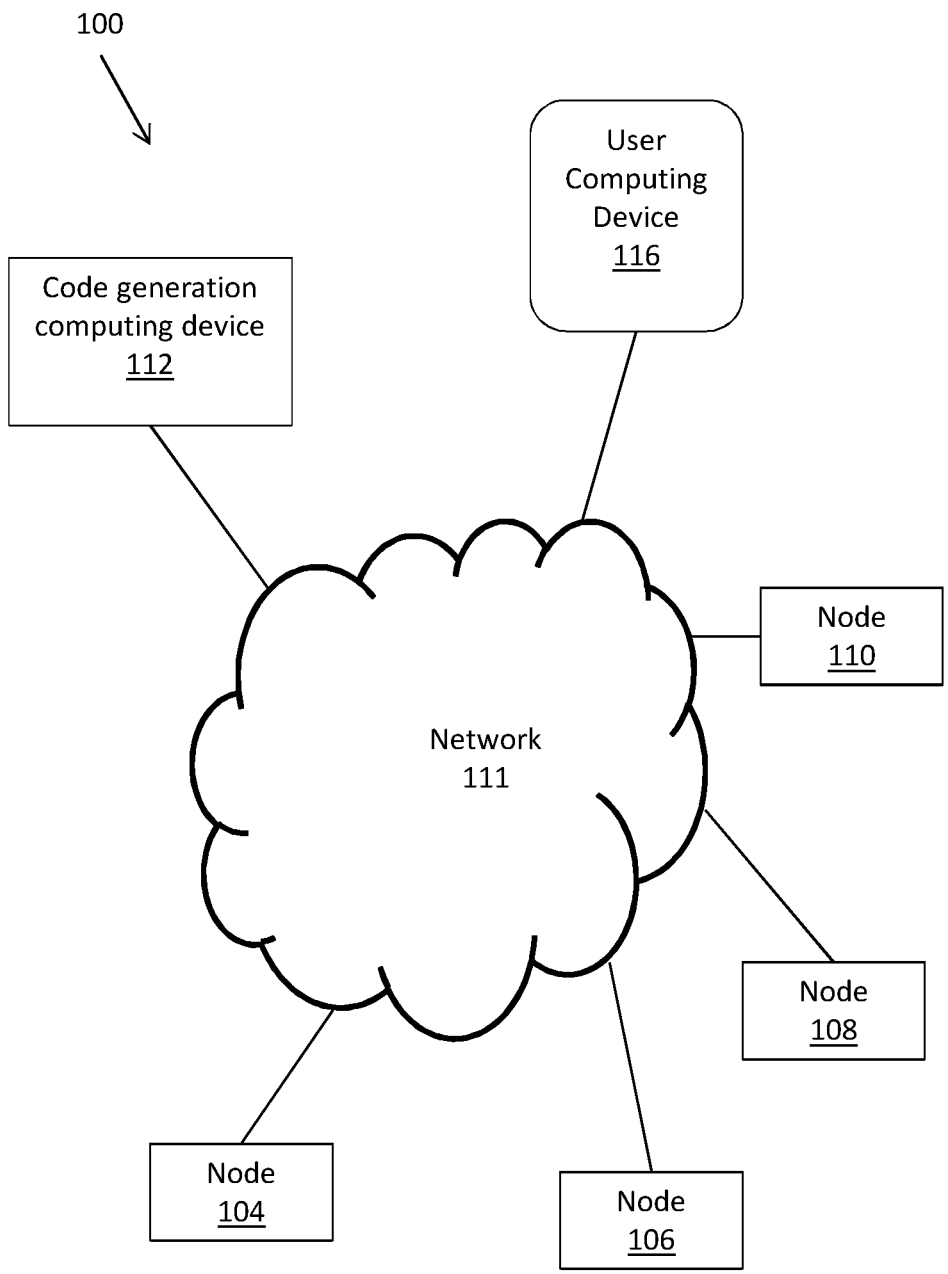
FIG. 1 depicts a block diagram illustrating components of a system for recording codes in a distributed environment in accordance with an exemplary embodiment.

Described in detail herein are systems and methods for recording codes in a distributed environment. The system comprises one or more computer-readable media and nodes, including, for example, a first node and/or a second node. The nodes are communicatively coupled to the one or more computer-readable media. The first node receives data including sensitive information and at least one code associated with the sensitive information from a code generation computing device via a network. In an exemplary embodiment, the code generation computing device is a point-of-sale terminal and the at least one code is associated with a transaction. In additional embodiments, the sensitive information is encrypted and/or is password protected. The first node analyzes the data to identify the at least one code. The first node adds a first new block to a first cryptographically verifiable encrypted ledger represented by a first sequence of blocks that is stored in one or more non-transitory computer-readable media. The first cryptographically verifiable encrypted ledger is an encrypted database held and updated independently by each node. The first new block added to the first cryptographically verifiable encrypted ledger contains the sensitive information, the at least one code and a hash of a previous block in the first sequence of blocks.

The first node adds a second new block to a second cryptographically verifiable unencrypted ledger represented by a second sequence of blocks that is stored in one or more non-transitory computer-readable media. The second cryptographically verifiable unencrypted ledger is an unencrypted database held and updated independently by each node. The second new block added to the second cryptographically verifiable unencrypted ledger contains the at least one code, a reference to the first new block, and a hash of a previous block in the second sequence of blocks. The first node concurrently adds the first new block to the first cryptographically verifiable encrypted ledger and the second new block to the second cryptographically verifiable unencrypted ledger.

The first node or a second node retrieves, in the network, the at least one code from the second cryptographically verifiable unencrypted ledger. The first node or the second node analyzes the at least one code pursuant to a set of rules. The first node or the second node analyzes the at least one code independently of the sensitive information. The sensitive information may be, for example, sensitive financial information and/or sensitive customer information related to a transaction. The at least one code does not include sensitive information.

In an exemplary embodiment, each node of the plurality of nodes adds one or more blocks to the first cryptographically verifiable encrypted ledger and one or more blocks to the second cryptographically verifiable unencrypted ledger. As a result, the blocks in the second cryptographically verifiable unencrypted ledger includes a plurality of codes associated with transactions. Each block includes a code associated with a transaction. The code may, for example, identify a transaction type (for example, identifying an online or an in-store transaction, a sale, a refund, an authorization, etc.), a category (for example, identifying a category for a product associated with a transaction), or other identifying information related to the transaction (for example, location information, time information, etc. related to a transaction). The first node or the second node retrieves the codes from the second cryptographically verifiable unencrypted ledger. The first node or the second node analyzes the codes pursuant to a set of rules. In an exemplary embodiment, a result of the analysis is displayed on a user computing device.

In one embodiment, the set of rules comprise analyzing the at least one code for types, categories, and/or identifying information. For example, a type may be a transaction type (e.g., online or in-store, a sale, a refund, an authorization, etc.). Categories may include categorizing information associated with the transaction (e.g., product category for product associated with the transaction). Identifying information may include information about a specific transaction (net amount, gross amount, merchant name, transaction location, etc.).

In another embodiment, the set of rules comprise at least one of cleaning the at least one code and/or transforming the at least one code from a first format into a second format. In still another embodiment, the set of rules comprise performing at least one of statistical analysis using statistical techniques, graphical analysis using graphical techniques, modeling, time-series analysis, classifications, and clustering. In such embodiments, a spectrum of tools may be used to analyze and/or visualize the at least one code. In another embodiment, the set of rules comprise using a data-visualization tool for generating interactive charts, visualizations, and dashboards using the at least one code.

In one embodiment, the system includes a classification engine used to identify and evaluate patterns and expressions within the at least one code. In some embodiments, the system uses a collection of machine learning algorithms for data mining tasks. The algorithms can either be applied directly to the at least one code or the data including the at least one code.

In one embodiment, the first node or the second node receives in the network, a query associated with the at least one code. In response to the query, the receiving node retrieves from the second cryptographically verifiable unencrypted ledger, the at least one code and the data associated with the at least one code. A user computing device associated with the receiving node displays the at least one code and the data associated with the at least one code.

The first cryptographically verifiable encrypted ledger and the second cryptographically verifiable unencrypted ledger differ based on encryption. The information in the blocks in the second cryptographically verifiable unencrypted ledger is visible, while the information in the blocks in the first cryptographically verifiable encrypted ledger is encrypted and cannot be viewed without first decrypting the information.

The systems and methods described herein create secure/encrypted records while simultaneously creating unencrypted records of information that may be important in data analysis. The systems and methods described herein further creates indelible records of transactions and information related to transactions that cannot be changed; furthermore, the record's authenticity can be verified using the distributed cryptographically verifiable ledgers (e.g., a blockchain) instead of a single centralized authority. With a distributed database and peer-to-peer verification of a blockchain system, users of the system, such as decentralized businesses, can each have confidence in the authenticity and accuracy of the record stored in the blockchain. They can further share non-sensitive information to an unencrypted ledger that is secure and trust-worthy.

FIG. 1 depicts a block diagram illustrating components of a system for recording codes in a distributed environment 100, in accordance with an exemplary embodiment. The distributed environment 100 may include, for example, retail stores. The environment 100 includes a plurality of nodes communicating over a network 111. In the example illustration, the environment 100 includes a first node 104 and a second node 106. However, the environment 100 can include any number of nodes as needed in the environment 100.

A node is a computer connected to the network and can add blocks directly to the blockchain. Each node in the system comprises a network interface, a control circuit, and a memory. The control circuit may comprise a processor, a microprocessor, and the like and may be configured to execute computer readable instructions stored on a computer readable storage memory. The computer readable storage memory may comprise volatile and/or non-volatile memory and have stored upon it a set of computer readable instructions which, when executed by the control circuit, causes the node to update the blockchain stored in the memory based on communications with other nodes over the network 111. In some embodiments, the control circuit may further be configured to extend the blockchain by processing updates to form new blocks for the blockchain. Generally, each node may store a version of the blockchain (e.g., each of the first node 104, the second node 106, the third node 108, and the fourth node 110 has its own copy of the ledger), and together, may form a distributed database.

The environment 100 includes a code generation computing device 112. The code generation computing device 112 generates at least one code. In an embodiment, the at least one code is associated with a transaction. In an exemplary embodiment, the code generation computing device 112 is a point-of-sale terminal used in the transaction. In some embodiments, the code generation computing device 112 is also a node (e.g., the first node 104, the second node 106, or the third node 108).

In one embodiment, a user computing device 116 displays results of data analysis and/or receives a query associated with the code. In some embodiments, the user computing device 116 acts as a node (e.g., the first node 104, the second node 106, or the third node 108, or a fourth node 110). In response to the query, the receiving node (i.e., the first node 104, the second node 106, or the third node 108 receiving the query) can query the blockchain to identify data associated with a code or a transaction. In response to the query, the node retrieves, from a cryptographically verifiable encrypted ledger, the code and/or data associated with the code. The user computing device 116 acting as the receiving node displays the code and/or data associated with the code.

In an example embodiment, one or more portions of the communications network 111 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

As a non-limiting example, environment 100 can be implemented in a plurality of retail stores located in a distributed environment. For example, the plurality of retail stores can be located within a country and/or throughout the world. In addition, the plurality of retail stores can be owned by different companies that, for example, only share the first cryptographically verifiable encrypted ledger and the second cryptographically verifiable unencrypted ledger and do not otherwise share common information, such as a system or a database of transactions.

Although FIG. 1 depicts four nodes 104, 106, 108, and 110, one code generation computing device 112, and one user computing device 116, exemplary embodiments of the environment 100 can include any number of nodes, code generation computing devices, and user computing devices.

Figure 2:
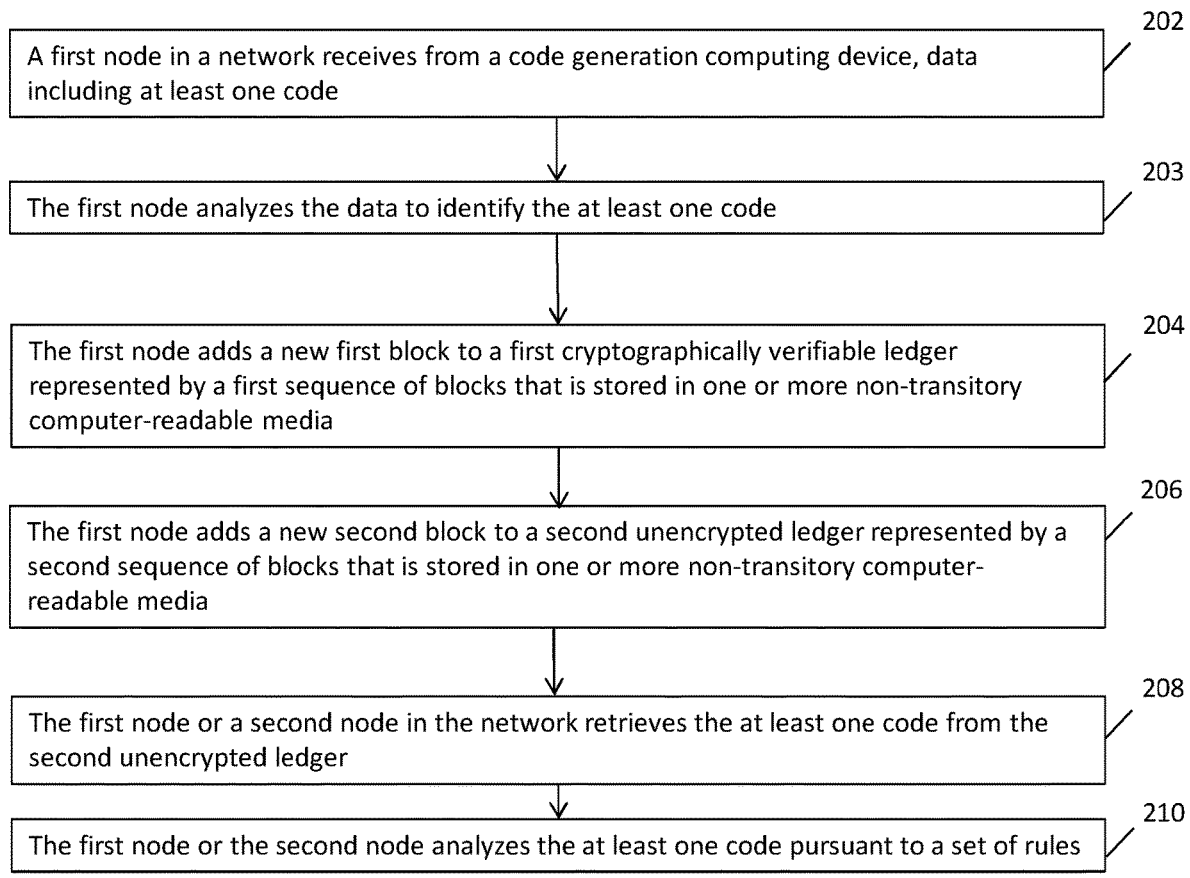
FIG. 2 illustrates a method for recording codes in a distributed environment in accordance with an exemplary embodiment.

FIG. 2 illustrates a method for recording codes in a distributed environment, in accordance with an exemplary embodiment. At step 202, a first node in a network receives from a code generation computing device, data including sensitive information and at least one code associated with the sensitive information. In an exemplary embodiment, the sensitive information is encrypted and/or is password protected. At step 203, the first node analyzes the data to identify the at least one code. At step 204, the first node adds a first new block to a first cryptographically verifiable encrypted ledger represented by a first sequence of blocks that is stored in one or more non-transitory computer-readable media. The first block added to the first cryptographically verifiable encrypted ledger contains the sensitive information, the at least one code, and a hash of a previous block in the first sequence of blocks. At step 206, the first node adds a second new block to a second cryptographically verifiable unencrypted ledger represented by a second sequence of blocks that is stored in one or more non-transitory computer-readable media. The second block added to the second unencrypted verifiable ledger contains the at least one code, a reference to the first block, and a hash of a previous block in the second sequence of blocks. At step 208, the first node or a second node in the network retrieves the at least one code from the second cryptographically verifiable unencrypted ledger. At step 210, the first node or the second node analyzes the at least one code pursuant to a set of rules.

Figure 3:
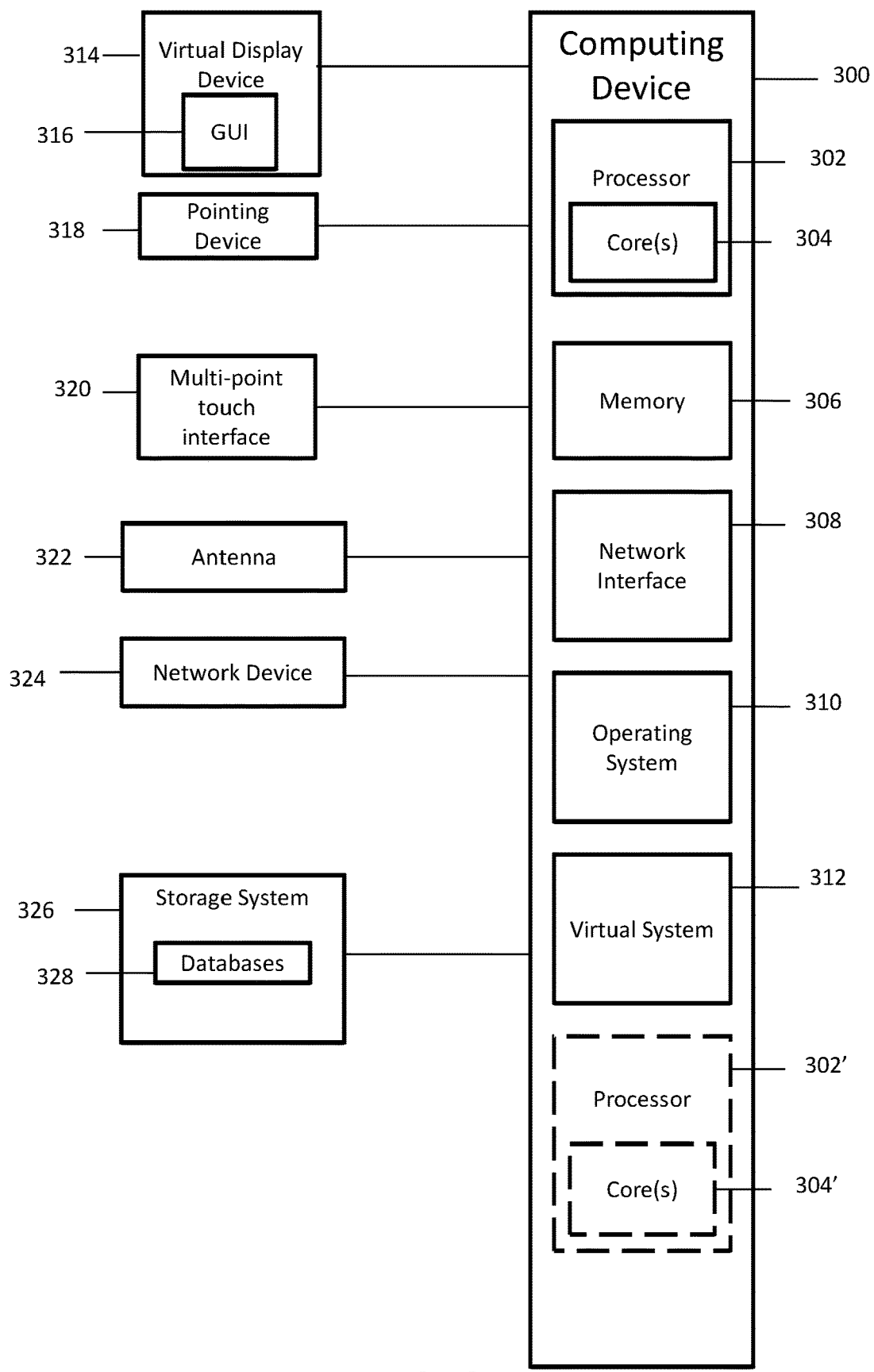
FIG. 3 depicts a block diagram of an exemplary computing device for recording codes in a distributed environment in accordance with an exemplary embodiment.

FIG. 3 is a block diagram of an example computing device 300 for implementing exemplary embodiments of the present disclosure. For example, the computing device 300 can be embodied as a node or a portion of a node and/or as a user computing device to display a result of data analysis, as described above. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof. A user may interact with the computing device 300 through a visual display device 314, such as a computer monitor, which may display one or more graphical user interfaces 316, multi touch interface 320 and a pointing device 318.

The computing device 300 may also include one or more storage devices 326, such as a hard-drive, CD-ROM, or other computer readable media, for storing data and computer-readable instructions and/or software that implement exemplary embodiments of the present disclosure. For example, exemplary storage device 326 can include one or more databases 328 for storing information associated with transactions. The databases 328 may be updated manually or automatically at any suitable time to add, delete, and/or update one or more data entries in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the central computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Descriptions of some embodiments of blockchain technology are provided with reference to FIG. 4-9 herein. In embodiments described herein, blockchains may be utilized to record codes in a ledger. The nodes in a distributed blockchain system store a copy of the blockchain record. In an exemplary embodiment, updates to the blockchain(s) are prompted by transactions, and one or more nodes on the system may be configured to incorporate one or more updates into blocks to add to the distributed database.

Distributed database and shared ledger database generally refer to methods of peer-to-peer record keeping and authentication in which records are kept at multiple nodes in the peer-to-peer network instead of kept at a central trusted party. A blockchain may generally refer to a distributed database that maintains a growing list of records in which each block contains a hash of some or all previous records in the chain to secure the record from tampering and unauthorized revision. A hash generally refers to a derivation of original data. In some embodiments, the hash in a block of a blockchain may comprise a cryptographic hash that is difficult to reverse and/or a hash table. Blocks in a blockchain may further be secured by a system involving one or more of a distributed timestamp server, cryptography, public/private key authentication and encryption, proof standard (e.g. proof-of-work, proof-of-stake, proof-of-space), and/or other security, consensus, and incentive features. In some embodiments, a block in a blockchain may comprise one or more of a data hash of the previous block, a timestamp, a cryptographic nonce, a proof standard, and a data descriptor to support the security and/or incentive features of the system.

In some embodiments, embodiments of the system can include a plurality of nodes configured to generate computational proof of record integrity and the chronological order of its use for content through a peer-to-peer network. In some embodiments, when a blockchain is updated in embodiments of the system, a node in the distributed environment takes a hash of a block of items to be timestamped and broadcasts the hash to other nodes on the peer-to-peer network. The timestamp in the block serves to prove that the data existed at the time in order to get into the hash. In some embodiments, each block includes the previous timestamp in its hash, forming a chain, with each additional block reinforcing the ones before it. In some embodiments, the network of timestamp server nodes performs the following steps to add a block to a chain: 1) new activities are broadcasted to all nodes, 2) each node collects new activities into a block, 3) each node works on finding a difficult proof-of-work for its block, 4) when a node finds a proof-of-work, it broadcasts the block to all nodes, 5) nodes accept the block only if activities are authorized, and 6) nodes express their acceptance of the block by working on creating the next block in the chain, using the hash of the accepted block as the previous hash. In some embodiments, nodes may be configured to consider the longest chain to be the correct one and work on extending it.

Figure 4:
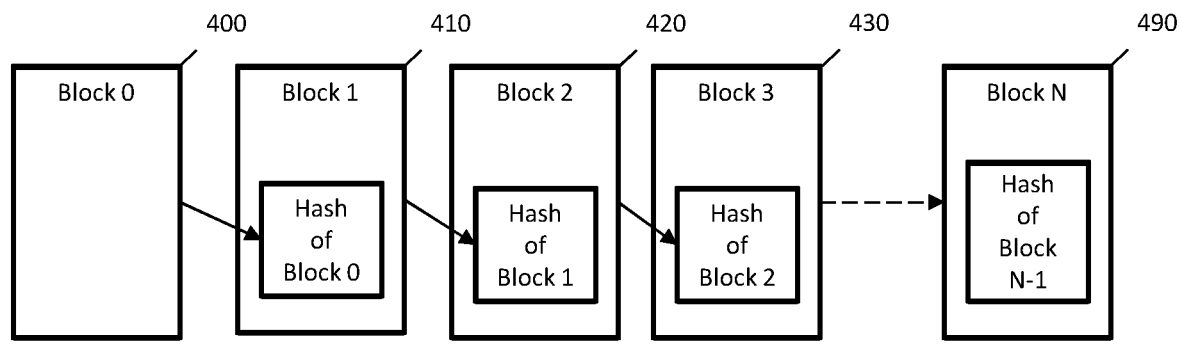
FIG. 4 illustrates blocks as configured in accordance with various embodiments of the present disclosure.

Now referring to FIG. 4, an illustration of a blockchain (for example, the first cryptographically verifiable encrypted ledger and/or the second cryptographically verifiable unencrypted ledger) according to some embodiments is shown. In some embodiments, the blockchain created by embodiments of the system can includes a hash chain or a hash tree in which each block added in the chain contains a hash of the previous block. In FIG. 4, block 0 400 represents a genesis block of the chain. Block 1 410 contains a hash of block 0 400, block 2 420 contains a hash of block 1 410, block 3 430 contains a hash of block 2 420, and so forth. Continuing down the chain, block N contains a hash of block N-1. In some embodiments, the hash may comprise the header of each block. Once a chain is formed, modifying or tampering with a block in the chain would cause detectable disparities between the blocks. For example, if block 1 is modified after being formed, block 1 would no longer match the hash of block 1 in block 2. If the hash of block 1 in block 2 is also modified in an attempt to cover up the change in block 1, block 2 would not then match with the hash of block 2 in block 3. In some embodiments, a proof standard (e.g. proof-of-work, proof-of-stake, proof-of-space, etc.) may be required by the system when a block is formed to increase the cost of generating or changing a block that could be authenticated by the consensus rules of the distributed system, making the tampering of records stored in a blockchain computationally costly and essentially impractical. In some embodiments, the blockchain(s) created by embodiments of the system may comprise a hash chain stored on multiple nodes as a distributed database and/or a shared ledger, such that modifications to any one copy of the chain would be detectable when the system attempts to achieve consensus prior to adding a new block to the chain.

In some embodiments, the blocks in the blockchains created by embodiments of the system may contain rules and data for authorizing different types of actions and/or parties who can take action. In some embodiments, transaction and block forming rules may be part of the software algorithm on each node. When a new block is being formed, any node on the system can use the prior records in the blockchain to verify whether the requested action is authorized.

Figure 5:
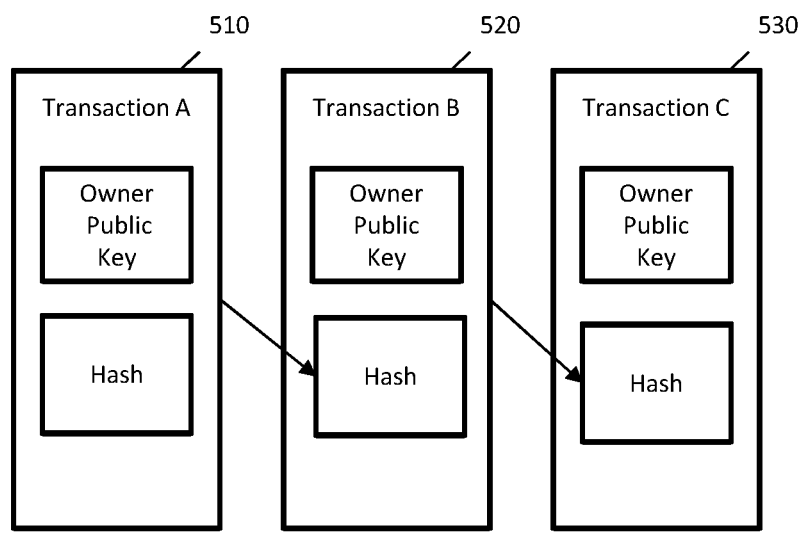
FIG. 5 illustrates transactions configured in accordance with various embodiments of the present disclosure.

Now referring to FIG. 5, an illustration of blockchain based transactions according to some embodiments is shown. In some embodiments, the blockchain illustrated in FIG. 5 comprises a hash chain protected by public key encryption (in some embodiments, private key encryption may also be used). As an example, Transaction A 510 represents a code recorded in a block of a blockchain associated with a transaction that occurred. Transaction A 510 contains a first node's public key and/or signature for the transaction and a hash of a previous block. When the first node or a second node receives another code associated with a transaction, a block containing transaction B 520 is formed. The record of transaction B 520 comprises a public key of the first node or the second node and a hash of the previous block. When the first node, the second node, or a third node receives another code associated with a transaction, a block containing transaction C 530 is formed. The record of transaction C 530 comprises a public key of the first node, the second node, or the third node and a hash of the previous block. In some embodiments, when each transaction record is created, the system may check previous transaction records and the current node's public key signature to determine whether the transaction is valid. In some embodiments, transactions are broadcasted in the peer-to-peer network and each node on the system may verify that the transaction is valid prior to adding the block containing the transaction to their copy of the blockchain. In some embodiments, nodes in the system may look for the longest chain in the system to determine the most up-to-date transaction record. The transactions in FIG. 5 are shown as an example only. In some embodiments, a blockchain record and/or the software algorithm may comprise any type of rules that regulate who and how the chain may be extended.

Figure 6:
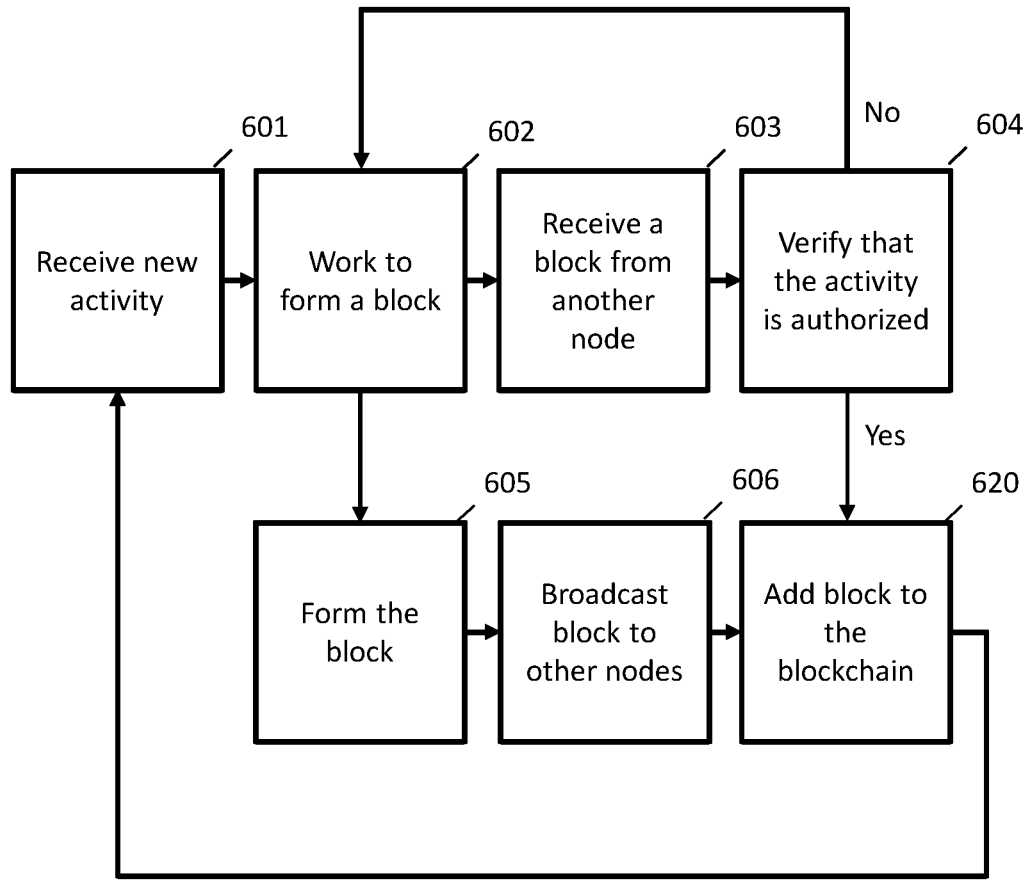
FIG. 6 is a flow diagram in accordance with various embodiments of the present disclosure.

Now referring to FIG. 6, a flow diagram according to some embodiments is shown. In some embodiments, the steps shown in FIG. 6 may be performed by a processor-based device, such as a computer system, a server, a distributed server, a timestamp server, a blockchain node, and the like. In some embodiments, the steps in FIG. 6 may be performed by one or more of the nodes in a system using blockchain for record keeping.

In step 601, a node receives a new activity. The new activity may comprise an update to the record being kept in the form of a blockchain. In some embodiments, the new activity may be broadcasted to a plurality of nodes on the network prior to step 601. In step 602, the node works to form a block to update the blockchain. In some embodiments, a block may comprise a plurality of activities or updates and a hash of one or more previous block in the blockchain. In some embodiments, the system may comprise consensus rules for individual transactions and/or blocks and the node may work to form a block that conforms to the consensus rules of the system. In some embodiments, the consensus rules may be specified in the software program running on the node. For example, a node may be required to provide a proof standard (e.g. proof of work, proof of stake, etc.) which requires the node to solve a difficult mathematical problem for form a nonce in order to form a block. In some embodiments, the node may be configured to verify that the activity is authorized prior to working to form the block. In some embodiments, whether the activity is authorized may be determined based on records in the earlier blocks of the blockchain itself.

After step 602, if the node successfully forms a block in step 605 prior to receiving a block from another node, the node broadcasts the block to other nodes over the network in step 606. In some embodiments, in a system with incentive features, the first node to form a block may be permitted to add incentive payment to itself in the newly formed block. In step 620, the node then adds the block to its copy of the blockchain. In the event that the node receives a block formed by another node in step 603 prior to being able to form the block, the node works to verify that the activity recorded in the received block is authorized in step 604. In some embodiments, the node may further check the new block against system consensus rules for blocks and activities to verify whether the block is properly formed. If the new block is not authorized, the node may reject the block update and return to step 602 to continue to work to form the block. If the new block is verified by the node, the node may express its approval by adding the received block to its copy of the blockchain in step 620. After a block is added, the node then returns to step 601 to form the next block using the newly extended blockchain for the hash in the new block.

In some embodiments, in the event one or more blocks having the same block number is received after step 620, the node may verify the later arriving blocks and temporarily store these block if they pass verification. When a subsequent block is received from another node, the node may then use the subsequent block to determine which of the plurality of received blocks is the correct/consensus block for the blockchain system on the distributed database and update its copy of the blockchain accordingly. In some embodiments, if a node goes offline for a time period, the node may retrieve the longest chain in the distributed system, verify each new block added since it has been offline, and update its local copy of the blockchain prior to proceeding to step 601.

Figure 7:
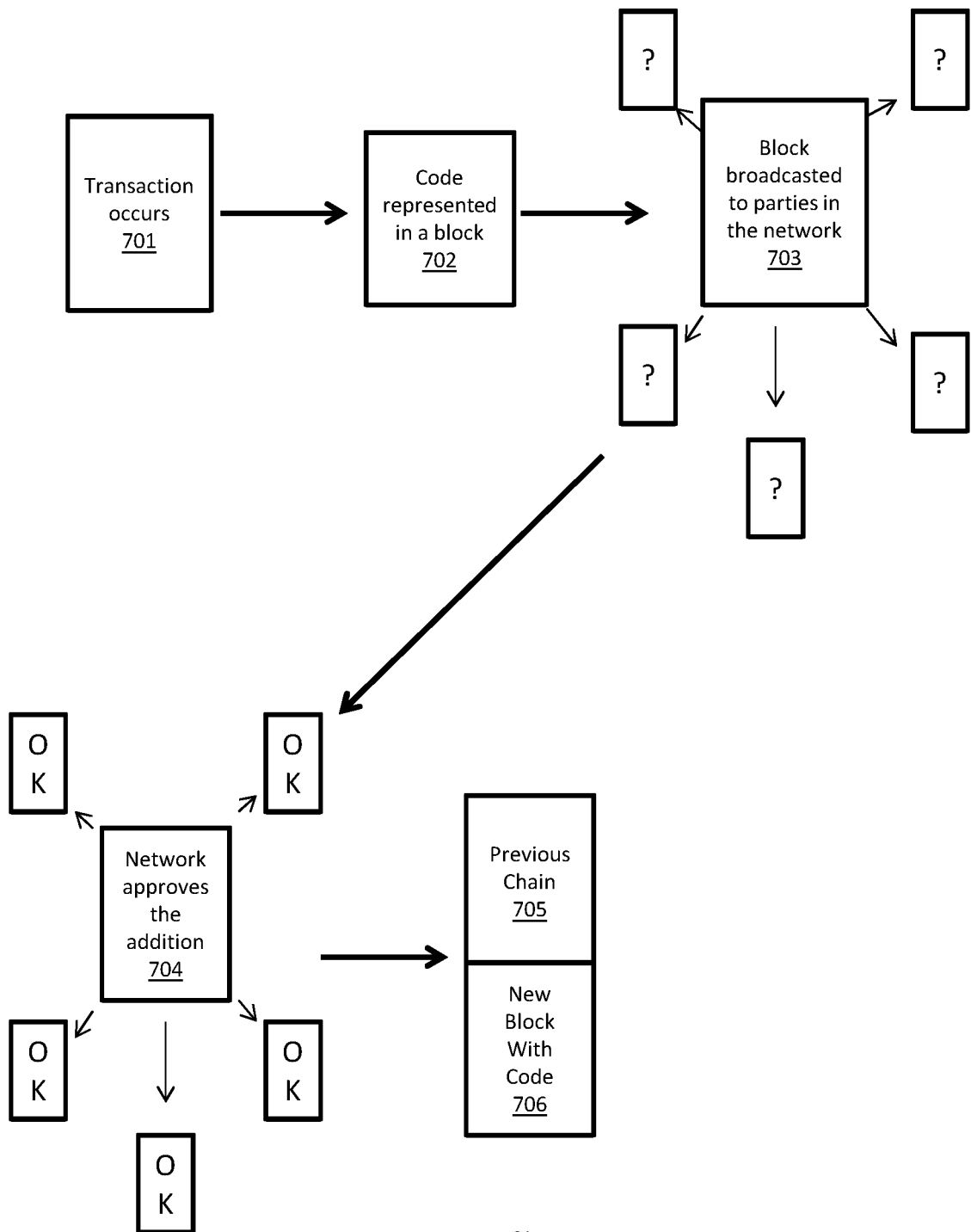
FIG. 7 depicts a process diagram as configured in accordance with various embodiments of the present disclosure.

Now referring to FIG. 7, a process diagram of a blockchain update according to some implementations in shown. In step 701, node A receives a code associated with a transaction. In step 702, the code in step 701 is represented as a block. In some embodiments, nodes may be required to satisfy proof-of-work by solving a difficult mathematical problem to form the block. In some embodiments, other methods of proof such as proof-of-stake, proof-of-space, etc. may be used in the system.

In step 703, the block is broadcasted to parties in the network. In step 704, nodes in the network approve the addition of the block by examining the block. In some embodiments, the nodes may check the solution provided as proof-of-work to approve the block. In some embodiments, the nodes may check the block against the record in the longest blockchain in the system to verify that the block is valid. In some embodiments, a block may be approved with consensus of the nodes in the network. After a block is approved, the new block 706 with a code is added to the existing chain 705 comprising blocks that chronologically precede the new block 706. The new block 706 may contain the code and a hash of one or more blocks in the existing chain 705. In some embodiments, each node may then update their copy of the blockchain with the new block and continue to work on extending the chain with additional transactions.

Figure 8:
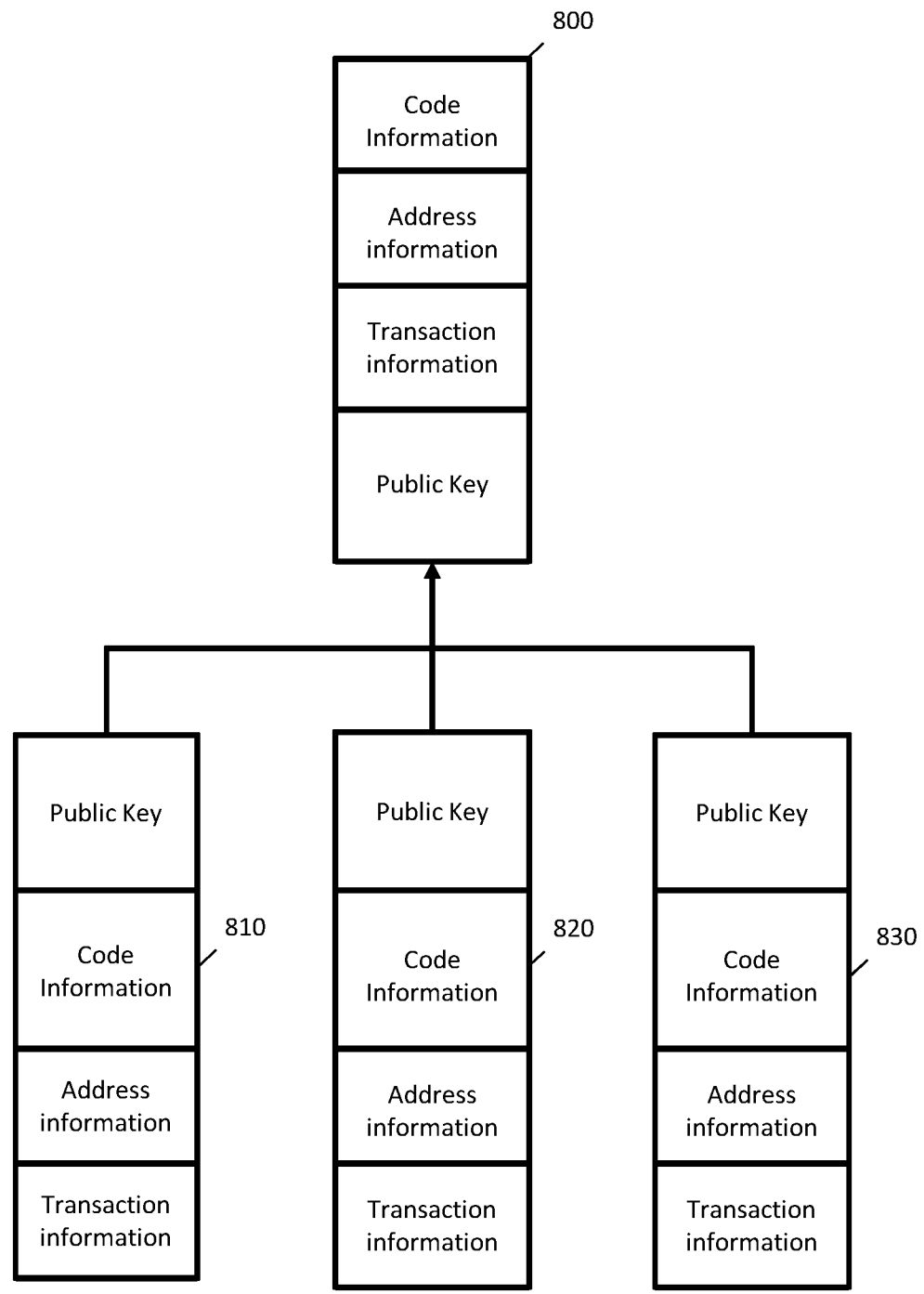
FIG. 8 illustrates a record configured in accordance with various embodiments of the present disclosure.

Now referring to FIG. 8, a diagram of a blockchain according to some embodiments is shown. FIG. 8 comprises an example of an implementation of a blockchain system for record keeping. The records 800, 810, 820, 830, each comprise code information, address information, transaction information (for example, date and time the block is added to the blockchain), and a public key associated with a node. In some embodiments, nodes may each store a copy of the codes. A new block may be broadcasted and verified by the nodes on the system before being added to the distributed record blockchain.

With the scheme shown in FIG. 8, the blockchain may be updated by one or more of the nodes to form a record of the codes without a trusted third party while preventing unauthorized modifications to the record. With the distributed database and peer-to-peer verification of a blockchain system, users can each have confidence in the authenticity and accuracy of the codes stored in the form of a blockchain.

Figure 9:
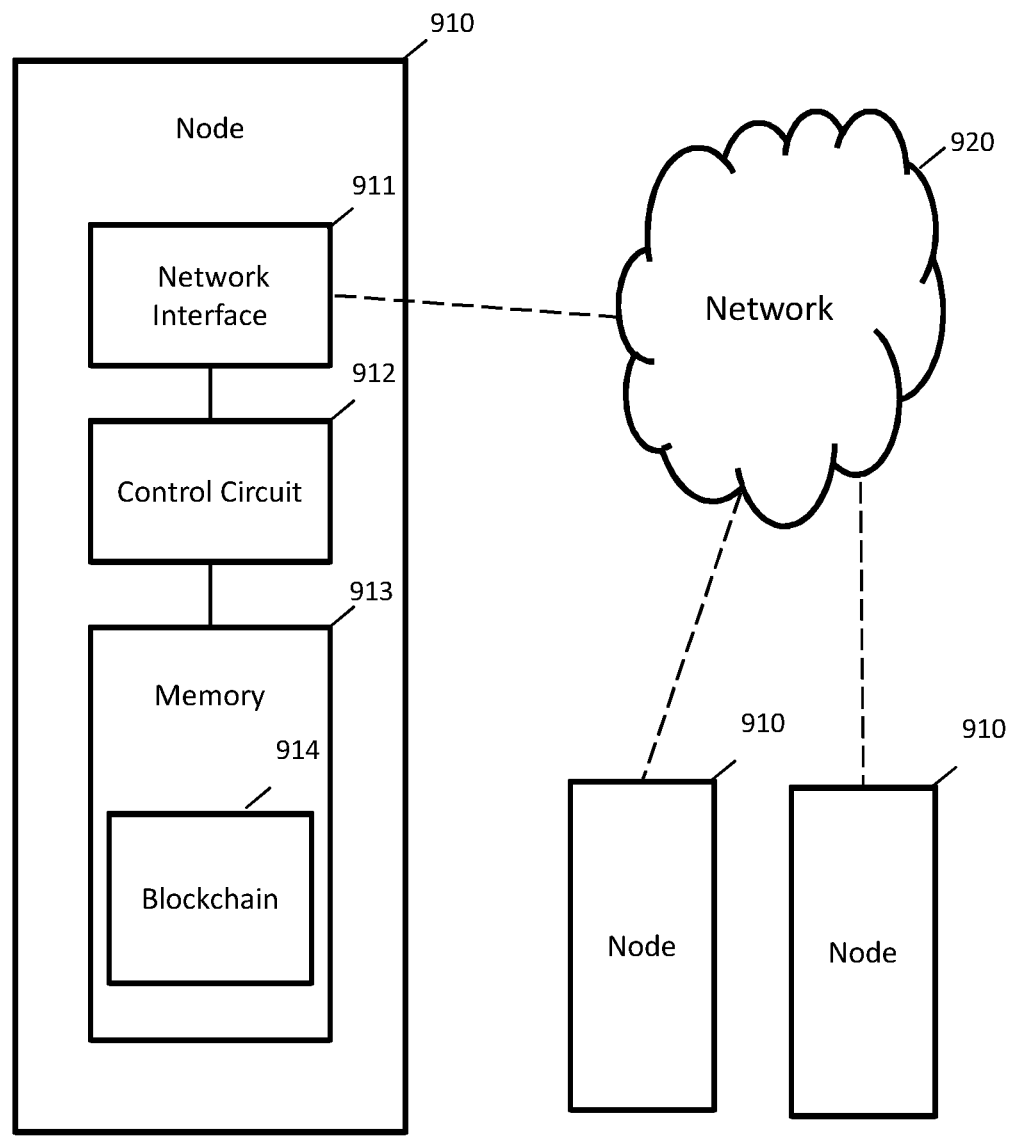
FIG. 9 depicts a system diagram configured in accordance with various embodiments of the present disclosure.

Now referring to FIG. 9, a system according to some embodiments is shown. Embodiments of the system can include a plurality of nodes 910 communicating over a network 920. In some embodiments, the nodes 910 may be comprise a distributed blockchain server and/or a distributed timestamp server. Each node 910 in the system comprises a network interface 911, a control circuit 912, and a memory 913.

The control circuit 912 may comprise a processor, a microprocessor, and the like and may be configured to execute computer readable instructions stored on a computer readable storage memory 913. The computer readable storage memory may comprise volatile and/or non-volatile memory and have stored upon it a set of computer readable instructions which, when executed by the control circuit 912, causes the node 910 update the blockchain 914 stored in the memory 913 based on communications with other nodes 910 over the network 920. In some embodiments, the control circuit 912 may further be configured to extend the blockchain 914 by processing updates to form new blocks for the blockchain 914. Generally, each node may store a version of the blockchain 914, and together, may form a distributed database. In some embodiments, each node 910 may be configured to perform one or more steps described with reference to FIGS. 1-8 herein.

The network interface 911 may comprise one or more network devices configured to allow the control circuit to receive and transmit information via the network 920. In some embodiments, the network interface 911 may comprise one or more of a network adapter, a modem, a router, a data port, a transceiver, and the like. The network 920 may comprise a communication network configured to allow one or more nodes 910 to exchange data. In some embodiments, the network 920 may comprise one or more of the Internet, a local area network, a private network, a virtual private network, a home network, a wired network, a wireless network, and the like. In some embodiments, the system does not include a central server and/or a trusted third party system. Each node in the system may enter and leave the network at any time.

With the system and processes shown herein, once a block is formed, the block cannot be changed without redoing the work to satisfy census rules thereby securing the block from tampering. A malicious attacker would need to provide proof standard for each block subsequent to the one he/she seeks to modify, race all other nodes, and overtake the majority of the system to affect change to an earlier record in the blockchain.

In some embodiments, in the peer-to-peer network, the longest chain proves the sequence of events witnessed, proves that it came from the largest pool of processing power, and that the integrity of the document has been maintained. In some embodiments, the network for supporting blockchain based record keeping requires minimal structure. In some embodiments, messages for updating the record are broadcast on a best-effort basis. Nodes can leave and rejoin the network at will and may be configured to accept the longest proof-of-work chain as proof of what happened while they were away.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A method for recording codes in a distributed environment, the method comprising:
   receiving, by a first node in a network from a code generation computing device, data including sensitive information and at least one code associated with the sensitive information, the sensitive information being encrypted;
   analyzing, by the first node, the data to identify the at least one code;
   adding, by the first node, a first new block to a first cryptographically verifiable encrypted ledger represented by a first sequence of blocks that is stored in one or more non-transitory computer-readable media, the first block added to the first cryptographically verifiable encrypted ledger containing the sensitive information, the at least one code and a hash of a previous block in the first sequence of blocks;
   adding, by the first node, a second new block to a second cryptographically verifiable unencrypted ledger represented by a second sequence of blocks that is stored in one or more non-transitory computer-readable media, the second new block added to the second unencrypted verifiable ledger containing the at least one code, a reference to the first block, and a hash of a previous block in the second sequence of blocks;
   retrieving, by the first node or a second node in the network, the at least one code from the second new block of the second cryptographically verifiable unencrypted ledger; and
   analyzing, by the first node or the second node, the at least one code pursuant to a set of rules.

2. The method of claim 1, wherein the set of rules comprise analyzing the at least one code for at least one of a type, a category, or identifying information.

3. The method of claim 1, wherein the set of rules comprise at least one of cleaning the at least one code or transforming the at least one code from a first format into a second format.

4. The method of claim 1, wherein the set of rules comprise performing at least one of statistical analysis using statistical techniques, graphical analysis using graphical techniques, modeling, time-series analysis, classifications, or clustering.

5. The method of claim 1, wherein the set of rules include using an data-visualization tool for generating interactive charts, visualizations, and dashboards using the at least one code.

6. The method of claim 1, further comprising identifying and evaluating, via a classification engine, patterns and expressions within the at least one code.

7. The method of claim 1, wherein the set of rules comprise using one or more machine learning algorithms for data mining tasks associated with the at least one code.

8. The method of claim 1, further comprising:
   receiving, by the first node, the second node, or a third node, in the network, a query associated with the data including the at least one code;
   in response to the query, retrieving, by the receiving node from the second cryptographically verifiable unencrypted ledger, the at least one code; and
   displaying, by a user computing device associated with receiving the node, the at least one code.

9. The method of claim 1, wherein the code generation computing device is a point-of-sale terminal.

10. The method of claim 1, wherein the code is associated with a transaction.

11. A system comprising:
   one or more computer-readable media; and
   at least one of a first node or a second node in a network being operatively coupled to the one or more computer-readable media, the at least one of the first node or the second node configured to:
     receive, by the first node from a code generation computing device, data including sensitive information and at least one code, the sensitive information being encrypted;
     analyze, by the first node, the data to identify the at least one code;
     add, by the first node, a first new block to a first cryptographically verifiable encrypted ledger represented by a first sequence of blocks that is stored in one or more non-transitory computer-readable media, the first block added to the first cryptographically verifiable encrypted ledger containing the sensitive information, the at least one code and a hash of a previous block in the first sequence of blocks;
     add, by the first node, a second new block to a second cryptographically verifiable unencrypted ledger represented by a second sequence of blocks that is stored in one or more non-transitory computer-readable media, the second block added to the second unencrypted verifiable ledger containing the at least one code, a reference to the first block, and a hash of a previous block in the second sequence of blocks;
     retrieve, by the first node or a second node in the network, the at least one code from the second cryptographically verifiable unencrypted ledger; and
     analyze, by the first node or the second node, the at least one code pursuant to a set of rules.

12. The system of claim 11, wherein the set of rules comprise analyzing the at least one code for at least one of a type, a category, or identifying information.

13. The system of claim 11, wherein the set of rules comprise at least one of cleaning the at least one code or transforming the at least one code from a first format into a second format.

14. The system of claim 11, wherein the set of rules comprise performing at least one of statistical analysis using statistical techniques, graphical analysis using graphical techniques, modeling, time-series analysis, classifications, or clustering.

15. The system of claim 11, wherein the set of rules include using an data-visualization tool for generating interactive charts, visualizations, and dashboards using the at least one code.

16. The system of claim 11, further comprising a classification engine configured to identify and evaluate patterns and expressions within the at least one code.

17. The system of claim 11, wherein the set of rules comprise using one or more machine learning algorithms for data mining tasks associated with the at least one code.

18. The system of claim 11, the at least one of the first node or the second node further configured to:

receive, by the first node or the second node, in the network, a query associated with the data including the at least one code;

in response to the query, retrieve, by the receiving node from the second cryptographically verifiable unencrypted ledger, the at least one code; and display, by a user computing device associated with receiving the node, the at least one code.

19. The system of claim 11, wherein the code generation computing device is a point-of-sale terminal.

20. The system of claim 11, wherein the code is associated with a transaction.

21. The system of claim 11, wherein the first node concurrently adds the first new block to the first cryptographically verifiable encrypted ledger and the second new block to the second cryptographically verifiable unencrypted ledger.

22. The system of claim 11, wherein the first node or the second node analyzes the at least one code from the second new block pursuant to the set of rules and independently of the sensitive information.

23. The system of claim 11, wherein the sensitive information is password protected.

* * * * *